United States Patent

[11] 3,558,846

[72] Inventor Akira Ujiie
 Kobe-shi, Japan
[21] Appl. No. 623,300
[22] Filed Mar. 15, 1967
[45] Patented Jan. 26, 1971
[73] Assignee Mitsubishi Jukogyo Kabushik Kaishai
 Chiyoda-Ku, Tokyo, Japan
[32] Priority Apr. 4, 1966
[33] Japan
[31] 41/21092

[54] METHOD OF AND APPARATUS FOR CONSTRUCTING SUBSTANTIALLY CIRCULAR CROSS SECTION VESSEL BY WELDING
12 Claims, 6 Drawing Figs.
[52] U.S. Cl. .................................................. 219/76,
 164/52; 1/88; 29/470; 228/57; 219/73
[51] Int. Cl. ........................................................ B23k 9/04
[50] Field of Search............................................ 219/76, 61,
 60.1, 137, 126, (Inquired), 4070; 164/52, 88,
 (Inquired); 228/57

[56] References Cited
UNITED STATES PATENTS

| Re. 25,105 | 12/1961 | Cargill, Jr. ..................... | 219/68 |
|---|---|---|---|
| 2,982,844 | 5/1961 | Ham............................... | 219/76 |
| 1,533,300 | 4/1925 | Baker............................. | 219/76 |
| 1,924,876 | 8/1933 | Morgan.......................... | 219/76X |
| 2,912,562 | 11/1959 | Donavan......................... | 219/76 |
| 3,209,119 | 9/1965 | Keidel et al.................... | 219/76 |
| 3,211,887 | 10/1965 | Cotterman..................... | 219/73X |

*Primary Examiner*—J. V. Truhe
*Assistant Examiner*—J. G. Smith
*Attorney*—McGlew and Toren ABSTRACT: A thick-walled, substantially circular cross section vessel, such as a pressure vessel, is fabricated solely from deposited weld metal. Formation of the vessel is effected by the progressive deposition of molten weld metal to form a continuous helical strip whose axially adjacent convolutions are contiguous, with the deposited molten weld metal being progressively deposited along, and solidified in contact with, already solidified metal so that the heat of the freshly deposited molten weld metal can be utilized to heat treat progressively the solidified metal along which the molten metal is progressively deposited. The deposited weld metal is force cooled immediately after deposition and the convolutions are progressively mechanically trimmed, to preset inner and outer diameters, immediately after they are formed.

The apparatus includes a turntable type of support rotated, relative to the source of molten weld metal, about the axis of the tubular body to be formed. During such rotation, the source of molten weld metal is moved progressively parallel to such axis so as to form the aforementioned helical strip by conjoint rotation of the support and of the body as it is formed and axial displacement of the source of weld metal. The support may be mounted for rotation about a horizontal axis, in which case the support is moved axially at a rate coordinated with its rate of rotation. Alternatively, the support may be rotated about a vertical axis and, in such case, the source of molten weld metal is moved upwardly as the vessel wall is formed.

Various welding processes may be used for depositing the weld metal, and among these may be mentioned electroslag welding, SIGMA welding, submerged arc welding and TIG welding.

INVENTOR.
AKIRA UJIIE
BY McGlew and Toren
ATTORNEYS

FIG. 4
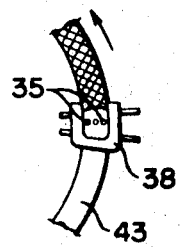
FIG. 6
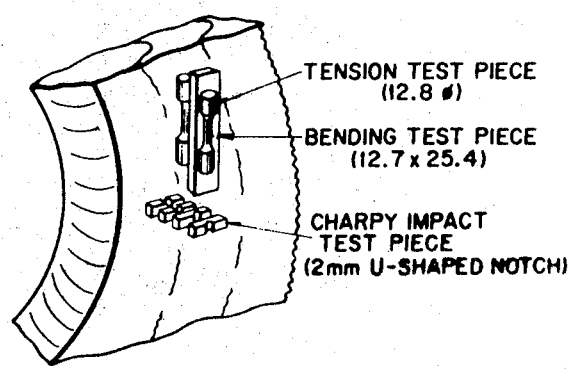
FIG. 5
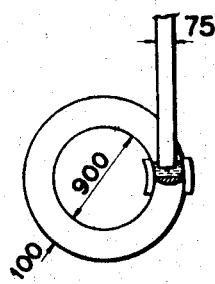 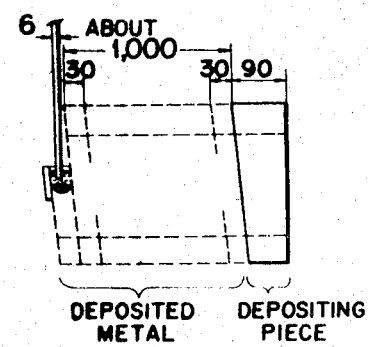
INVENTOR.
AKIRA UJIIE
BY
ATTORNEYS

3,558,846

METHOD OF AND APPARATUS FOR CONSTRUCTING SUBSTANTIALLY CIRCULAR CROSS SECTION VESSEL BY WELDING

BACKGROUND OF THE INVENTION

The invention relates to the manufacture of relatively thick-walled, substantially cross section vessels, particularly relatively large size pressure vessels, and, more particularly, to a novel method of and apparatus for manufacturing or forming such vessels solely from deposited weld metal.

Recently constructed pressure vessels, such as reactors used in the petroleum refining and other chemical industries, in nuclear piles, and as steam generator drums, have been designed for use at very high temperatures and pressures and furthermore have been designed for greatly increased capacity. This has required that these vessels be made with thicker walls, larger diameters and greater lengths. The tubular bodies of these vessels have been constructed of relatively thick curved plates which are welded together to form the vessel.

It is fact known to those engaged in steel making that the nonmetallic inclusions in a steel plate increase with the thickness of the plate. It is also known that the mechanical properties of a thick steel plate are not uniform in the direction of its thickness. Consequently, if bent or curved relatively thick plates are used to make a pressure vessel, the quality of the completed part may not be as good as desired.

In addition, the apparatus used for constructing a pressure vessel from thick plates, such as presses, rollers, annealing furnaces, welding apparatus, etc., is necessarily very large, in addition to which the construction techniques are very complicated and the cost of manufacture is very high. Consequently, the resultant product is, on the one hand, expensive and, on the other hand, not easy to obtain with a high degree of accuracy.

In order to overcome the above-mentioned disadvantages, a so-called multiwound or multilayer vessel recently has been developed. In this type of pressure vessel, a strip or wide plate is wound in superposed layers. However, the use of a pressure vessel of this type is limited due to restrictions as to the temperature at which it can be used. An additional disadvantage is that the securing of the enclosures in place is very complicated and, furthermore, boring the necessary openings through the wall of the pressure vessel is very difficult. A further disadvantage is that welding of drums of this latter type to each other, or to a single layer drum formed of welded metal plates, is very troublesome and difficult.

SUMMARY OF THE INVENTION

In accordance with the method of the invention, a relatively thick-walled, substantially circular cross section vessel, is constructed by progressively depositing molten weld metal to form a continuous helical strip whose axially adjacent convolutions are contiguous, and with the freshly deposited molten weld metal being progressively deposited along, and solidified in contact with, already solidified metal of an immediately preceding convolution. The heat of the freshly deposited molten weld metal is utilized to heat treat progressively the solidified metal along which the molten metal is progressively deposited. The formation of the helix is continued until a tubular body of a preselected axial length is formed solely by the deposited weld metal.

The deposited weld metal is force cooled immediately after deposition to solidify the same, and the radially inner and outer surfaces of the convolutions are progressively mechanically trimmed or machined to provide a vessel having preset inner and outer diameters.

The apparatus of the invention includes a rotatable turntable on which the initial convolutions of the helix is deposited. This turntable is rotated relative to a source of molten weld metal, and relative axial displacement is effected between the turntable and the source of molten weld metal, with the speed of such displacement and the angular velocity of the turntable being coordinated with the pitch of the helix so as to form a helical strip whose axially adjacent convolutions are contiguous. The turntable may be rotated about a horizontal axis and, in such case, the source of molten weld metal is preferably maintained fixed against displacement while the turntable is moved axially as the successive convolutions are formed. Alternatively, the turntable may be made rotatable about a vertical axis and, in such case, the turntable is not displaced axially but the source of molten weld metal is progressively moved upwardly as the convolutions are formed, the movement being parallel to the axis of rotation of the turntable.

An object of the present invention is to provide a novel method of and novel apparatus for constructing a relatively thick-walled, substantially circular cross section vessel, and which are free of the disadvantages mentioned above.

Another object of the invention is to provide a novel method of constructing a relatively thick-walled, substantially circular cross section vessel, utilizing only deposited weld metal.

A further object of the invention is to provide a method of the type just mentioned in which the molten weld metal is deposited in the form of a continuous helical strip whose axially adjacent convolutions are contiguous.

Yet another object of the invention is to provide such a method in which the freshly deposited molten weld metal is solidified in contact with already solidified metal, along which the molten metal is deposited.

A further object of the invention is to provide such a method in which the heat of the freshly deposited molten weld is utilized to heat treat progressively the solidified metal along which the molten metal is progressively deposited, such as the immediate preceding convolution of the helix.

Still another object of the invention is to provide a method of and apparatus for constructing a relatively thick-walled, substantially circular cross section, vessel at a relatively low cost and providing a vessel having uniform mechanical properties, and accurate dimensions, and which can be easily and accurately machined.

A further object of the invention is to provide a novel apparatus for performing the above-mentioned method.

BRIEF DESCRIPTION OF THE DRAWINGS

For an understanding of the principles of the invention, reference is made to the following description of typical embodiments thereof as illustrated in the accompanying drawings.

In the drawings:

FIG. 4 is a sectional view taken along the line IV-IV of FIG. 3;

FIGS. 5A and 5B are somewhat schematic illustrations illustrating the relative dimensions of a tubular vessel constructed in accordance with the invention; and FIG. 6 is a somewhat schematic partial perspective view of a pressure vessel formed in accordance with the present invention, and illustrating the removal of test pieces from the vessel.

DESCRIPTION OF THE PREFERRED EMBODIMENTS

Figure 1:
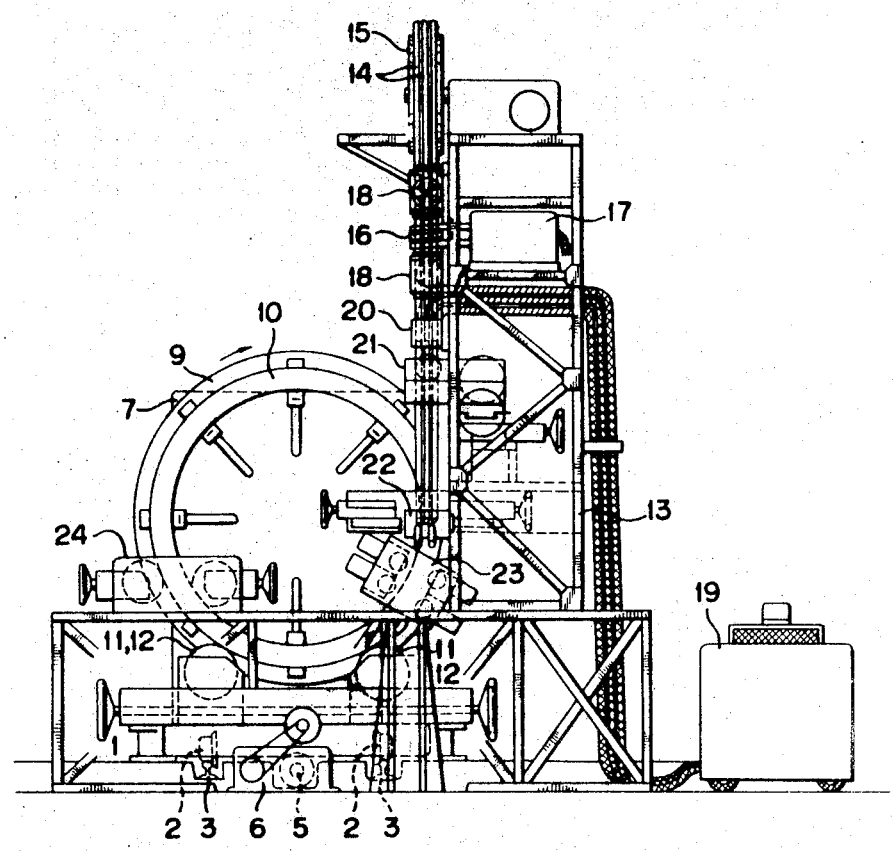
FIG. 1 is a front elevation view of one form of apparatus for performing the method of the present invention.
Figure 2:
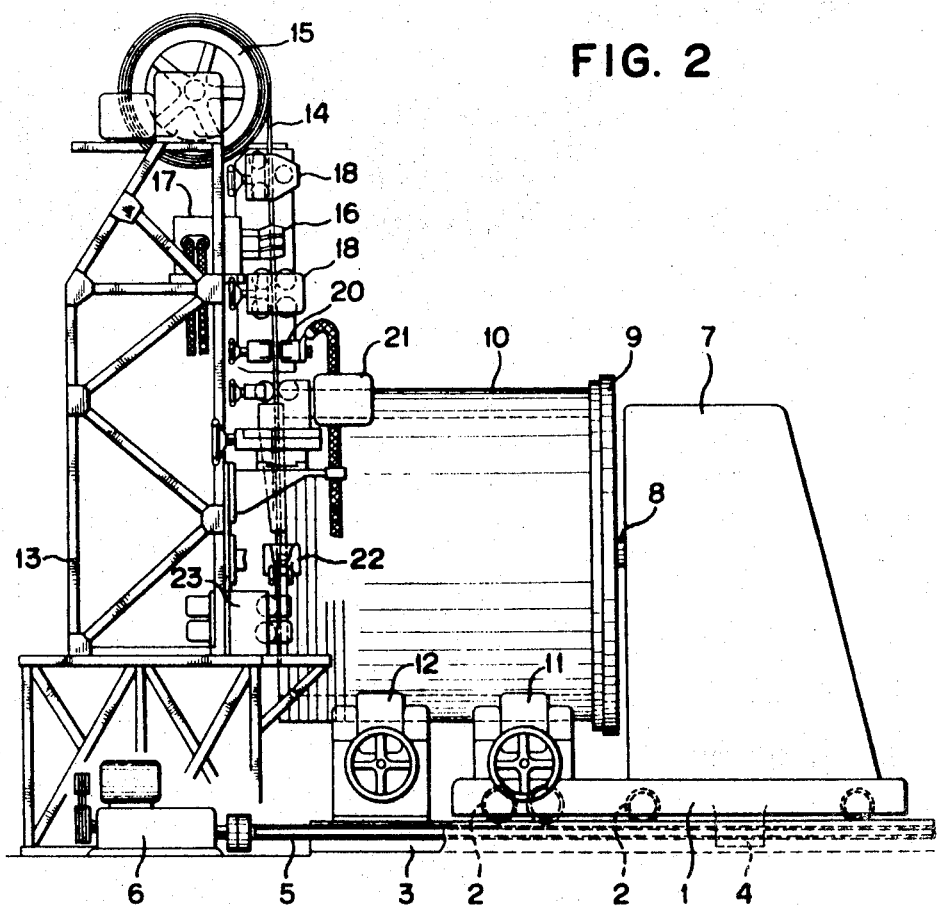
FIG. 2 is a side elevation view of the apparatus shown in FIG. 1.

Referring first to the embodiment of the invention shown in FIGS. 1 and 2, the illustrated method is performed using an electroslag welding process. As shown in FIGS. 1 and 2, a carriage 1 is provided with wheels 2 which roll on rails 3. A preferably integral nut 4 extends downwardly from carriage 1 and is threadedly engaged with a threaded shaft 5 which is rotated by means of a driving means generally indicated at 6. A pedestal 7 is mounted on a forward part of carriage 1 and has a rotatable shaft 8 extending therefrom and driven by an electric motor in pedestal 7, and which has not been illustrated. A frame body or turntable 9 is secured to shaft 8, and is arranged to have molten weld metal deposited thereon in the form of a helical strip, so as to form a tubular body 10 of a pressure vessel. The tubular body 10, as it is progressively formed, is rotatably supported both by rollers 11, on a rear part of carriage 1, and rollers 12 mounted rearwardly of rollers 11.

A fixed support structure 13 is provided somewhat rearwardly of the rollers 12, and rotatably supports a reel 15 having several steel strips 14 wound thereon, there being three strips shown and the number of strips being selected in accordance with a desired thickness of the wall of tubular body 10. As the strips 14 are withdrawn from reel 15 by feeding and straightening means 18, they are drawn through a heating coil 16 supplied from a heating transformer 17, coil 16 heating the curved welding strips or electrodes 14 so that the latter may be straightened easily by the feeding and straightening means 18. A welding current contact means 20 engages the strips 14 below the lower feeding and straightening means 18, and is supplied with welding current from a welding transformer 19, shown in FIG. 1. A further feeding means 21 is provided to feed the strips 14 beyond the contact jaw means 20, and the strips 14 are fed to a U-shaped water-cooled slidable metal strap or tun dish 22 in which the steel strips 14 are melted by electric current flowing through a slag in accordance with the principles of electroslag welding.

A cooling means 23 is provided downstream of strap or tun dish 22 and effects forced cooling of the deposited molten weld metal which, beneath strap 22, is at a red heat. At a point spaced angularly downstream of cooling means 23, a cutting means 24 is provided to trim the radially inner and outer surfaces of the cooled deposited weld metal to provide the requisite inner and outer radii of the tubular body.

In the operation of the above-mentioned apparatus for forming the tubular body 10, an annular base, of the same metal as used to form the body, is fixed to the revolving frame body, turret, or turntable 9. This annular member is used as a starting member on which the weld metal is deposited, and is not only axially very short but has the diameter and thickness of the tubular body to be constructed. The steel welding strips 14 are supplied with welding current through contact means 20, and are fed by feeder 21 into the water-cooled slidable metal strap 22 or tun dish, where a welding current flow is effected between strips 14 and the initial depositing member and through a molten slag of low electrical conductivity. This starts melting of the steel strips, and thereafter feeding of the melted strips is performed continuously onto the already deposited weld metal.

At the same time, turret or turntable 9 is turned by shaft 8, at a peripheral or circumferential speed corresponding to the speed of melting of strips 14. Concurrently, carriage 1 is continuously shifted forwardly parallel to the axis of vessel 10 at a speed coordinated with the speed of rotation of turret or turntable 9 so as to provide adjacent convolutions having a pitch of the helix which is correlated with the melting speed of the strips 14. Thus, turret 9 is rotated at a rate coordinated with the melting speed of the electrodes 14 and is also moved axially at a rate coordinated with the axial width of a convolution of the helix formed by the deposited weld metal.

As a result of these coordinated movements, the molten weld metal, resulting from melting strips or electrodes 14, inside metal strap 22 is helically deposited at a constant speed of rotation and is then solidified to form the tubular body 10, which thus comprises solely deposited weld metal. Body 10 is rotatably supported by the travelling rollers 11 and the fixed rollers 12, so that rotation of the body, as well as axial shifting thereof, is performed in a smooth manner.

The molten metal emerging from metal strap or tun dish 22, but which is still at a red heat, is subjected to continuous forced cooling by cooling means 23. The radially outer and inner surfaces of the solidified deposited metal convolutions are trimmed or cut by means of the mechanical trimming or cutting means 24, so that predetermined inner and outer diameters of tubular body 10 may be obtained readily.

As mentioned above, the tubular body 10 is constructed solely of the helically deposited molten weld metal, and constitutes a seamless body having a predetermined wall thickness and axial length. In the embodiment illustrated, the solidified deposited metal in each convolution of the helix has a width of from 30 mm. to 50 mm., irrespective of the finished wall thickness of the vessel. A comparatively small amount of molten metal is thus passed through a deoxidizing and desulfurizing bath of molten slag, so that nonmetallic inclusions, characteristic of thick plates, are substantially completely eliminated. In addition, the welding steel strips 14 are relatively inexpensive as compared to the cost of relatively thick plates, so that a thick wall, large size vessel can be made easily at a relatively low cost.

Furthermore, and as the method of the invention involves the progressive deposition of molten weld metal in the form of a continuous helical strip whose axially adjacent convolutions are contiguous, it is possible to select the welding conditions in such a manner that the heat of the electroslag used for progressively melting the welding steel strips 14 is also useable for reheating a previously deposited portion of the weld metal, such as the immediately preceding convolution of the helix, to its normalizing temperature. Thereby, effects of normalizing and tempering which are similar to those obtained in the case of heat treatment used in multilayer welding at the welding joints are present in the formation of tubular body 10 made solely of the deposited weld metal.

As only a comparatively small quantity of the deposited weld metal still at a red heat is force-cooled in a progressive manner by the cooling means 23, not only can the normalizing and tempering effects be obtained in a favorable manner, but also quenching and tempering effects can be obtained in a favorable manner. As a portion of the deposited weld metal can be subjected progressively to local heat treatment, a seamless pressure vessel can readily be made of heat-treated high strength steel which is relatively difficult to weld. In the procedure, there are no longer present any defects due to a heat-affected zone. By shifting either carriage 1 or the welding apparatus mounted on stand 13 in a direction perpendicular to the axis of the tubular body, and by continuously changing the distance between the water-cooled slidable metal strap 22 and the axis of rotating shaft 8, as well as changing the rotary speed of shaft 8, it is possible to change continuously the diameter of the helix during formation of the body. Thus, a circular cross-sectional body such as a corrugated cylinder, a semispherical cap, etc., whose diameter varies along the axis thereof, may readily be made by the method of the invention.

In the above-mentioned method, and solely by way of example, 2 ¼ Cr-1 Mo Steel (ASTM-A387-GrD) was used under the welding conditions shown in the following table 1. The resultant vessel is schematically illustrated in FIGS. 5A and 5B and, in order to check the mechanical properties thereof, test pieces were removed from the vessel as shown in FIG. 6. The results of the tests are shown in Table 2, from which it will be readily apparent that the tubular vessel has very good mechanical properties.

TABLE I.—WELDING CONDITION

| Welding material size | Flux | Voltage, v. | Current, a. | Steel-strip feeding speed, mm./min. | Depth of slag bath, mm. | Welding speed, mm./min. |
| --- | --- | --- | --- | --- | --- | --- |
| 6×75 mm. One Piece | Es-1,000 [1] | 55 | 2,800 | 250 | 45 | 65 |

[1] Made by applicants.

TABLE II (SR: 732° C × 8 hrs.)

[Tension Test]

| | Tensile strength, kg./mm.² | Yield point, kg./mm.² | Elongation, percent 2" | Contraction of area, percent | Bending test,(25.4ᴿ ×180°) | Impact value 20° C., Kg.-m./cm.² |
|---|---|---|---|---|---|---|
| Deposit metal | 52.4/53.3 | 33.5/34.3 | 31/32 | 72/74 | Good | 17.0/13.0/19.5/11.6 mean 15.3. |
| ASTM A336 F22 | >−49 | >−28 | >−18 | >−25 | | |

Figure 3:
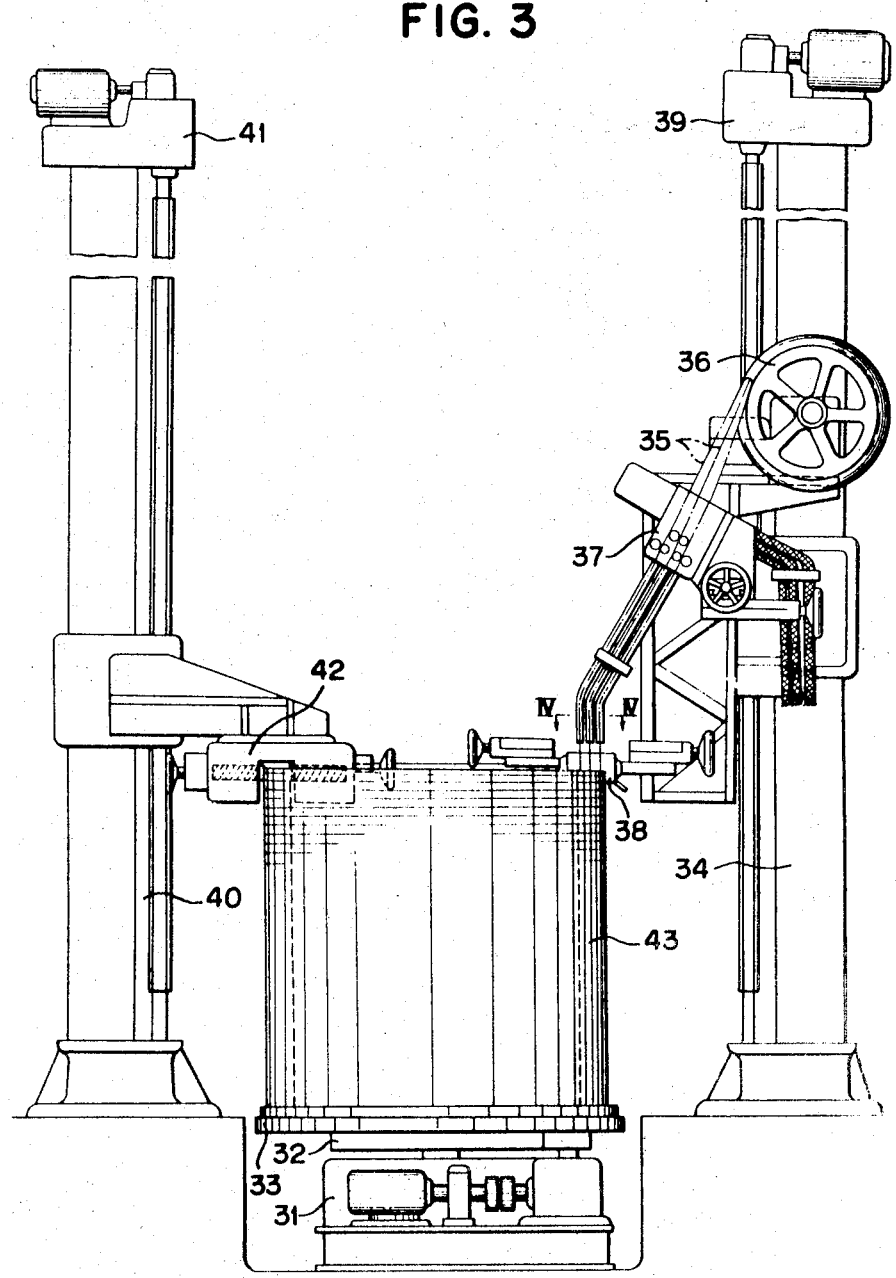
FIG. 3 is a front elevation view of another form of apparatus for performing the method of the invention.

In the embodiment of the invention shown in FIGS. 3 and 4, the welding is effected by SIGMA welding rather than by an electroslag welding process. Referring to FIGS. 3 and 4, turntable or turret 33 is rotatably mounted on a support 31 through the medium of a speed change gear 32. A fixed supporting stand or structure 34 is mounted adjacent body 33 and rotatably supports a reel 36 having wound thereon several continuous metal welding electrodes 35, of which three are illustrated. Support 34 also mounts a welding torch or head 37 having several nozzles, as well as mounting a welding apparatus including a U-shaped water-cooled slidable metal strap or tun dish 38. All of the mentioned members can be moved vertically of structure 34 by a lifting and lowering means 39 mounted at the upper end of structure 34. A metal cutting means 42 is mounted on another fixed supporting structure 40 for vertical displacement by means of a lifting and lowering means 41.

In this embodiment of the invention, frame body 33 is rotated on support 31 at a circumferential speed corresponding to the rate of melting of wires or strips 35. Wires 35 are fed from welding torch 37 to metal strap 38 whole while a shielding gas is continuously supplied. Welding torch 37, slidable metal strap 38 and reel 36 are continuously and progressively moved upwardly so that a desired pitch may be obtained for the helix, this pitch being determined taking into account the melting speed of wires or strips 35. Consequently, the molten metal deposited from wires 35 in slidable metal strap 38 is, due to the rotation of frame 33, deposited in the form of a helix. In the same manner as described for FIGS. 1 and 2, the freely deposited molten metal normalizes the previously deposited metal in the immediately preceding helix convolution, the freshly deposited molten metal being deposited upon this already deposited and solidified immediately preceding convolution. By finishing the radially inner and outer surface of the deposited metal by means of cutting means 42, a tubular body 43 is formed solely by the weld metal deposited in the form of a continuous helical strip.

It will be readily understood that the method of the present invention is not limited to the above-mentioned electroslag welding process and SIGMA welding process, but may also utilize a submerged arc welding process and a TIG welding process.

Summarizing the foregoing, in accordance with the present invention, molten weld metal is progressively deposited to form a continuous helical strip whose axially adjacent convolutions are contiguous, with freshly deposited molten weld metal being progressively deposited along, and solidified in contact with, already solidified metal so that the heat of the freshly deposited molten weld metal may be used to heat treat progressively the solidified metal of the preceding convolution along which the freshly molten metal is progressively deposited. The weld metal is force-cooled immediately after deposition, so that a tubular body or the like can be formed solely of deposited weld metal and in the form of a thick wall pressure vessel having a seamless wall. Such a vessel can be formed easily, accurately and at a relatively low cost, and its wall, though relatively thick, has a greatly decreased amount of nonmetallic inclusions, as compared to a pressure vessel formed of thick plates in addition the vessel has uniform mechanical properties contributing greatly to its utility.

I claim:

1. A method of constructing a large diameter, self-supporting pressure vessel having a relatively thick wall of uniform thickness throughout and having a substantially circular cross section body, comprising the steps of progressively depositing molten weld metal to form a continuous helical metal strip of constantly uniform width whose axially adjacent convolutions are contiguous, the fresh molten weld metal being progressively deposited along, and solidified in contact with, only already solidified deposited weld metal deposited immediately prior to the deposition of the fresh molten weld metal; utilizing the heat of the freshly deposited weld metal to heat treat progressively the solidified metal along which the fresh molten metal is progressively deposited; continuing the formation of the helix until a circular cross section self-supporting body of a preselected axial length is formed solely by the deposited weld metal which constitutes the entire thickness of the wall of the vessel; and, as the successive convolutions solidify during formation of the vessel, progressively mechanically trimming the radially inner and outer surfaces of the successive still hot weld metal convolutions at a speed substantially equal to the speed of deposition thereat to obtain predetermined inner and outer diameters of the body being formed.

2. A method, as claimed in claim 1, in which the molten weld metal is deposited as a continuous helical strip by rotation and axial displacement of the circular cross section body, which is being formed of the deposited metal, relative to the supply of molten weld metal.

3. A method, as claimed in claim 1, in which the molten metal is deposited as a continuous helical strip by rotating the body being formed while maintaining it fixed against axial displacement and by shifting the supply of molten weld metal axially of the body being formed at a rate coordinated with the angular velocity of the body being formed.

4. A method, as claimed in claim 1, in which the deposited molten weld metal, which is still at a red heat, is force-cooled.

5. A method, as claimed in claim 1, in which the molten weld metal is deposited by a SIGMA welding process.

6. A method, as claimed in claim 1, in which each convolution of the helix has, in the solidified condition, a width of from 30 mm. to 50 mm.

7. Apparatus for constructing a large diameter self-supporting pressure vessel having a relatively thick wall, of uniform thickness, and having a substantially circular cross section body, said apparatus comprising, in combination, supporting means operable to support the body only during formation thereof solely from deposited molten weld metal, said supporting means constituting the sole support for the deposited molten weld metal during formation of the body; molten weld metal depositing means positioned initially adjacent a body supporting surface of said supporting means; electric welding apparatus operable to supply molten weld metal to said depositing means; means operable to effect coordinated relative rotation and relative axial displacement of said supporting means and said depositing means, whereby molten weld metal is progressively deposited to form a continuous helical strip of constantly uniform width whose axially adjacent convolutions are contiguous, with the freshly deposited molten weld metal being progressively deposited along, and solidified in contact with, only already solidified deposited weld metal; and means operable to substantially solidify the deposited weld metal immediately after its deposition; said molten metal depositing means comprising a water-cooled turn dish arranged to receive weld metal from said electric welding apparatus.

8. Apparatus, as claimed in claim 7, including mechanical metal removal means engaging the successive still hot weld metal convolutions of the helix on the radially inner and outer surfaces thereof immediately after solidification thereof to trim the body to predetermined inner and outer radii.

9. Apparatus, as claimed in claim 7, in which said supporting means comprises a wheeled carriage; rails supporting said carriage for longitudinal movement; a pedestal on said carriage; a frame rotatably mounted on said pedestal for rotation about a substantially horizontal axis and serving as a starting surface on which weld metal is deposited to form said body; a stationary supporting stand adjacent one end of said rails and facing said frame; said molten weld metal depositing means and said electric welding apparatus being mounted on said supporting stand; first driving means operable to rotate said frame; and second driving means operable to move said carriage along said rails away from said fixed supporting stand; said first and second driving means operating in coordination to effect axial displacement of said frame and concurrent rotation thereof in accordance with the pitch of the helical strip of deposited weld metal.

10. Apparatus, as claimed in claim 7, in which said supporting means comprises a fixed support; a frame rotatably mounted on said fixed support for rotation about a substantially vertical axis, said frame serving for initial deposition of molten weld metal thereon to initiate formation of the tubular body; a supporting stand adjacent said fixed support; said metal depositing means and said welding apparatus being vertically displaceably mounted on said supporting stand; first driving means operable to rotate said frame; and second driving means operable to move said weld metal depositing means and said welding apparatus conjointly upwardly of said fixed supporting stand; said first and second driving means effecting rotation of said frame and upward movement of said weld depositing means and said electric welding apparatus at a rate coordinated with the pitch of said continuous helical strip.

11. Apparatus, as claimed in claim 7, in which said means for effecting substantial solidification of the deposited molten weld metal comprises a force cooling means operable on the metal deposited from said depositing means immediately after the metal has been deposited therefrom and while it is still at a red heat.

12. A method of constructing a large diameter, self-supporting pressure vessel having a relatively thick wall of uniform thickness throughout and having a substantially circular cross section body, comprising the steps of progressively depositing molten weld metal to form a continuous helical metal strip of constantly uniform width whose axially adjacent convolutions are contiguous, the fresh molten weld metal being progressively deposited along, and solidified in contact with, only already solidified deposited weld metal deposited immediately prior to the deposition of the fresh molten weld metal; utilizing the heat of the freshly deposited weld metal to heat treat progressively the solidified metal along which the fresh molten metal is progressively deposited; continuing the formation of the helix until a circular cross section self-supporting body of a preselected axial length is formed solely by the deposited weld metal which constitutes the entire thickness of the wall of the vessel; and, during formation of the vessel, progressively mechanically trimming the radially inner and outer surfaces of the successive convolutions to obtain predetermined inner and outer diameters of the body being formed; the molten weld metal being provided by an electroslag welding process.